United States Patent [19]
Cohen et al.

[11] Patent Number: 5,903,898
[45] Date of Patent: May 11, 1999

[54] METHOD AND APPARATUS FOR USER SELECTABLE LOGGING

[75] Inventors: Jeffrey I. Cohen, Mountain View; William H. Waddington, Foster City, both of Calif.; Daniel Leary, New Opsawich, N.H.

[73] Assignee: Oracle Corporation, Redwood Shores, Calif.

[21] Appl. No.: 08/658,058

[22] Filed: Jun. 4, 1996

[51] Int. Cl.⁶ .................................................. G06F 17/30
[52] U.S. Cl. ...................... 707/204; 707/200; 707/202; 707/203
[58] Field of Search .................................. 707/200, 202, 707/203, 204, 8

[56] References Cited

U.S. PATENT DOCUMENTS

| | | | |
|---|---|---|---|
| 5,062,045 | 10/1991 | Janis et al. | 364/200 |
| 5,278,982 | 1/1994 | Daniels et al. | 707/202 |
| 5,287,501 | 2/1994 | Lomet | 707/202 |

*Primary Examiner*—Thomas G. Black
*Assistant Examiner*—Donald Min
*Attorney, Agent, or Firm*—McDermott, Will & Emery

[57] ABSTRACT

A method and system for selectively disabling the logging of database operations during the execution of database processes or the creation of database objects is disclosed. According to the method, changes made to the database through data manipulation statements or queries can include a statement that the change to be executed is not to be logged. If the operation is to be logged, a log buffer stores the information about the changes and a log writer background process writes the operation entries to disk. Similarly, the creation or manipulation of database objects through object manipulation statements can be logged or not logged. As with logged data manipulation statements, if the manipulation of a database object is to be logged, a log buffer stores the information about the changes and a log writer background process writes the operation entries to disk.

20 Claims, 3 Drawing Sheets

METHOD AND APPARATUS FOR USER SELECTABLE LOGGING

FIELD OF THE INVENTION

The present invention relates to logging changes to a database. More specifically, the present invention relates to a method and apparatus for selecting whether logs are generated for operations acting on data or objects in a database.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. In a database server, a memory area called the System Global Area (SGA) is allocated and one or more processes are started to execute one or more transactions. The combination of the SGA and the processes executing transactions is called a database instance.

Some database systems provide a buffer cache that is shared among the processes that are executing transactions in a database. The buffer cache resides in a portion of the SGA and holds database information. Buffers in the buffer cache hold copies of data blocks that have been read from the data files of the database. The buffers are shared by the user processes concurrently connected to the instance. When a transaction desires to make a change to a data block, a copy of the data block is loaded into a buffer of the buffer cache and the change is made to the copy of the data block stored in the database buffer cache in dynamic memory. At some time subsequent to when a transaction makes a change data in the buffer cache, one of the database processes, referred to herein as the "database writer", writes the modified blocks of data from the database buffer cache to the data files on disk.

Several problems can halt the operation of a database or affect the writing of database information to disk. Common types of failures include:

statement failures, involving a logical failure in the handling of a statement in the database program, such logical failures include, for example: SQL statement errors, internal database errors, or resource problem errors;

process failures, involving a failure in a user, server, or background process of a database instance;

network failures, involving an interruption in the normal operation of the communication network connecting the database computers; and media failures, involving a physical problem reading or writing physical files needed for normal database operation.

Another type of failure is an instance failure. An instance failure can occur when a problem arises that prevents an instance from continuing work. Instance failures may result from hardware problems such as a power outage, or software problems such as an operating system crash. Instance failures can also occur expectedly, for example, when a SHUTDOWN ABORT or a STARTUP FORCE statement is issued.

A major aspect of database operation and administration involves the recovery of the database from the various types of failures encountered. Recovery processes vary depending on the type of failure that has occurred, the structures that have been affected, and the type of recovery that is desired.

Several structures and procedures may be implemented to safeguard a database against possible failures. One procedure is to perform an operating system backup of the program and data files that constitute the database. Another is to mirror the database to a separate storage device so that two identical copies of the database are always maintained. A third method is to record all changes made to a database by maintaining a log of every database instance.

The database backup and mirroring techniques typically require a significant amount of memory, generally requiring at least as much memory as occupied by the entire database itself since they involve duplicating the database to another storage medium. These duplicative methods also require increased user input since periodic operations must be performed, such as running the backup program.

An alternate approach to duplicating the entire database involves maintaining logs of operations. According to the logging approach, several different operation logs are maintained to perform various database maintenance functions. Specifically, a redo log is used to store database operations so that the operations can be re-performed to restore the database to its pre-failure state after a failure. For example, when a transaction modifies data in the data cache, a redo entry that specifies the modification is stored in a redo log on disk. If a failure occurs before the updated data within the buffer cache has been stored to disk, the modified data in the buffer cache may be lost. Under these conditions, the database may be modified based on the redo entry during the recovery process.

After a crash, the database should be returned to a state in which the database reflects either all of none of the changes made by any given transaction. If a transaction had not committed when the crash occurred, then any changes made by the transaction up to that point must be removed from the database. Therefore, in addition to a redo log, an undo log may be maintained to allow changes to be selectively removed from the database during a recovery operation. Specifically, when a transaction makes a change to the database, an undo entry is generated that indicates how to remove the change from the database. If the transaction is unable to complete successfully, the undo entries generated for the transaction may be applied to remove all changes made to the database by the transaction.

The basic component of a log system is a log file stored on disk. Redo log files are filled with redo entries that store low-level representations of database changes. Redo entries contain the information necessary to reconstruct, or redo, changes made by data operations such as INSERT, UPDATE, DELETE, CREATE, ALTER, or DROP. Redo entries are generated for each change made to a copy of a data block stored in the database buffer cache. In one implementation, a redo log buffer is a circular buffer that holds information about update operations recently performed by transactions. The redo log buffer is written to an active online redo log file group on disk by a background process. The records in the online redo log file group on disk are referred to as redo logs.

It should be noted that one log could be used to store transaction information for both redo and undo operations, or a separate log could be maintained for each function. If a separate log is maintained to store undo information, the procedure for creating the undo log and undo log buffer is essentially identical to the procedure for creating the redo log and redo log buffer as described above.

System resources are required to generate log entries, maintain a log buffer in dynamic memory, and maintain a log file on disk. The redo entries take up continuous, sequential space in the log buffer. The log buffer can occupy a significant amount of random access memory, while the log file can occupy a significant amount of disk space. Moreover, the need to generate log entries when any update operation is performed slows down the execution of the update operation. If separate logs are maintained for redo and undo operations, the memory requirements and cycle time are correspondingly increased. Thus, logging causes database operations to execute more slowly and take up more memory. If the database system includes transactions or operations that do not need to be re-performed in case of failure, then logging every operation may result in a significant waste of time and computer resources.

Based on the foregoing, it is desirable to provide a database system in which logging, with its associated overhead, may be avoided in those situations that do not require the redo and undo functionality that logging provides.

SUMMARY OF THE INVENTION

The present invention provides a method and apparatus for selectively disabling the logging of database operations and transactions.

According to the method, a parameter is provided which indicates whether log entries are to be generated during the performance of a particular data manipulation operation. If the operation is to be performed with logging, information that identifies the operation will be written to a log file on disk. If the operation is to be performed without logging, the operation is performed without storing a log that reflects the user data generated during the operation.

According to another aspect of the invention, a method for selectively disabling the logging option during the creation of a database object is provided. According to the method, a database object or structure created within the database contains a flag which indicates whether logs are to be generated during operations which affect the object or data within the object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for selecting whether database operations are to be logged is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
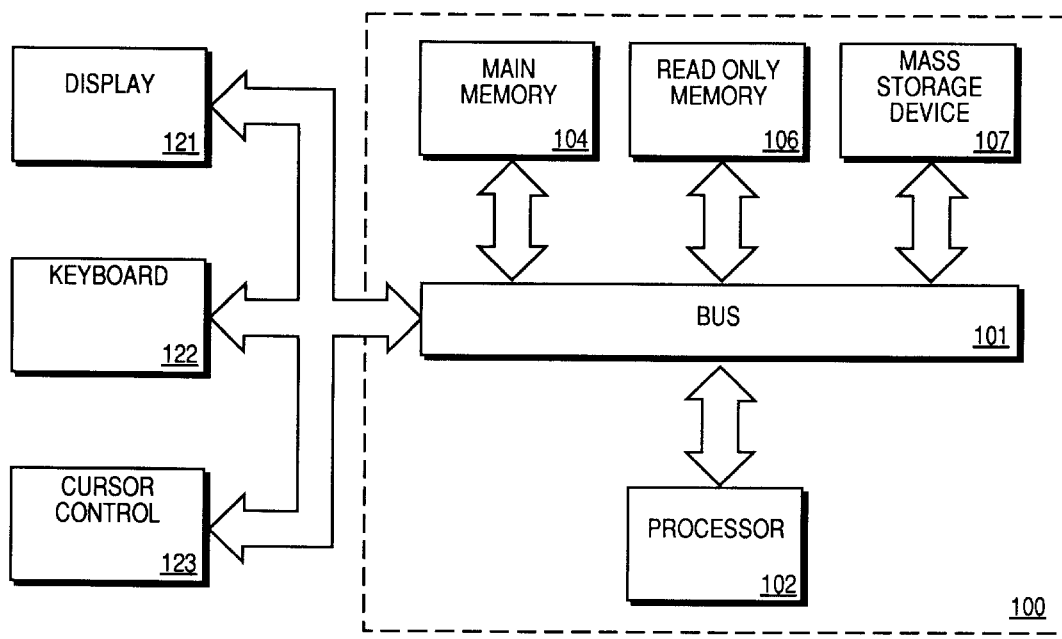
FIG. 1 is a block diagram of a system which may be used to implement an embodiment of the present invention.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 202. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

In the currently preferred embodiment of the invention, computer system 100 is configured to execute a database application which consists of executing database query instructions and creating database objects.

STRUCTURED QUERY LANGUAGE

The Structured Query Language (SQL) is one example of a database access language that can be used to specify database operations. Users write database programs, applications, or operations in SQL, and an SQL language compiler automatically generates a procedure to perform the desired task. For the purposes of explanation, it shall be assumed that all operations performed on the information in a database are performed in response to execution of SQL statements. However, the present invention is not limited to any particular database language or compiler.

An SQL statement can consist partly of SQL reserved words, or dedicated commands which have a special and unique meaning in SQL, along with variables, values, or names. SQL statements are analogous to very simple, but powerful computer programs or instructions.

SQL statements can be divided into five general categories: data manipulation statements, object manipulation statements, transaction control statements, session control statements, and embedded SQL statements. An SQL statement is a specific instance of a valid SQL command, and can generally be regarded as a database "operation".

OPERATION LOGGING

Figure 2:
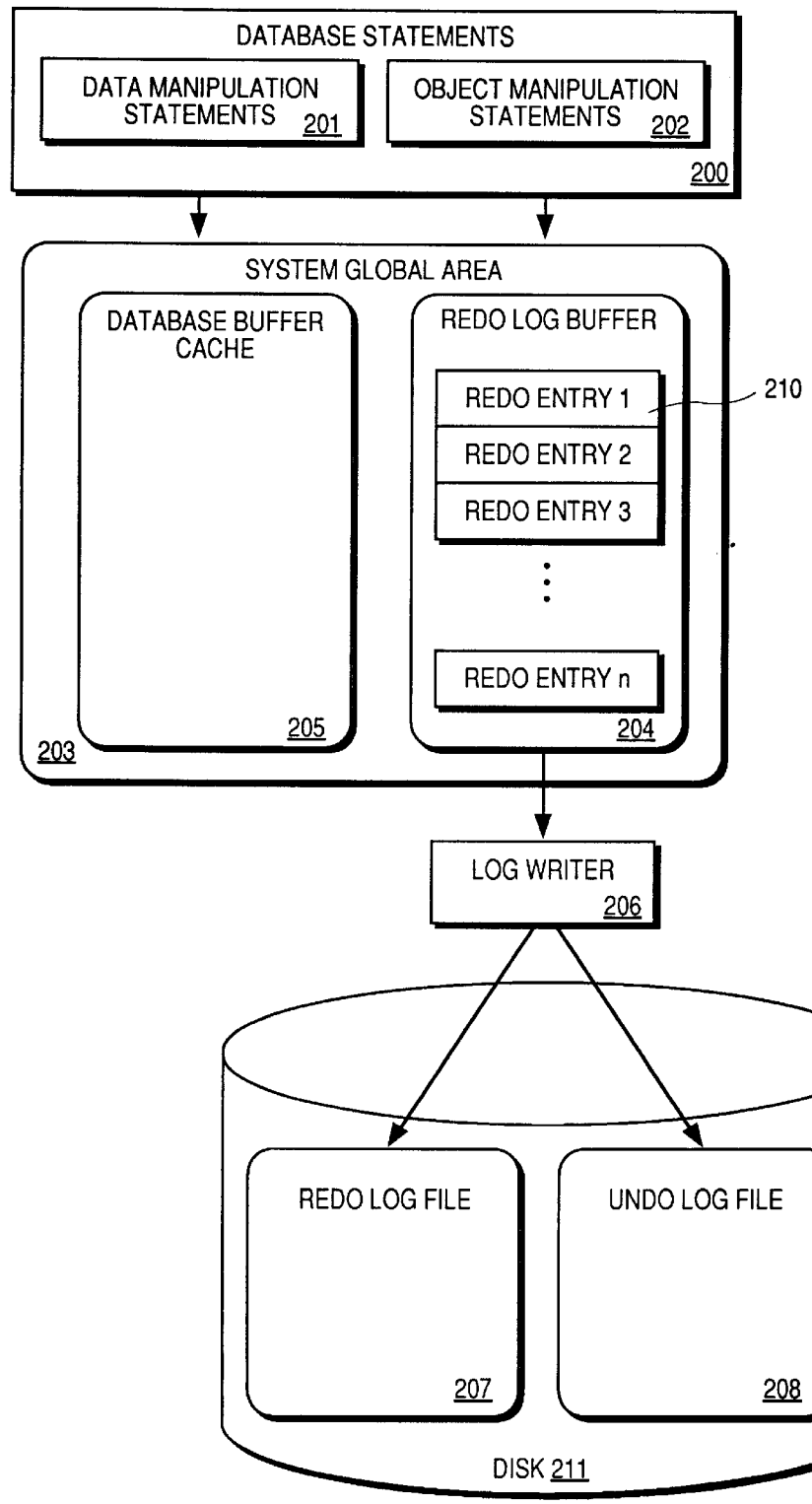
FIG. 2 illustrates the generation of log files upon the execution of a database instruction.

Inherent to database management is the function of protecting the database from failures such as those due to hardware, software, network, process or system problems. As mentioned above, some database systems generate log entries for every operation that updates a database in order to safeguard against the possibility of database instance failures. FIG. 2 illustrates a database system in which logging can be selectively enabled and disabled according to an embodiment of the invention. When logging is enabled, information that specifies changes made to the database are stored in a log file. One such log file is a redo log file 207 in which SQL statements are sequentially stored as they are executed. In case of a failure, the database can be reconstructed by re-performing the SQL statements from the redo log on the data in the database.

Database statements 200 are written to the system global area 203. The statements can comprise any of the five categories mentioned above, however the more common types of statements are data manipulation statements 201 and object manipulation statements 202. The system global area 203 is a shared memory region that contains data and control information for the database. Within the system global area 203 are various structures for storing the statements to be executed and the data to be operated upon. The database buffer cache 205 stores the most recently used blocks of database data, and typically contains modified data that has not yet been permanently written to disk.

Another structure within the system global area is the redo log buffer 204. The redo log buffer is filled with redo entries 210. Each redo entry contains information that identifies one or more operations performed on the database. The redo entries take up continuous, sequential space in the buffer, and are copied by the database server processes from the user's memory space. The entries in the redo log buffer 204 are written to the active online redo log file 207 on disk 211 by a background process such as a Log Writer 206.

The Log Writer process 206 writes all redo entries that have been copied into the redo log buffer 210 since the last time Log Writer 206 wrote to the redo log file 207. Log Writer 206 writes one contiguous portion of the redo log buffer 204 to the disk. For example, the Log Writer 206 can be configured to write:

(1) a commit record when a user process commits a transaction
(2) redo entries every three seconds
(3) redo entries when the redo log buffer 204 is one-third full
(4) redo entries when modified data is written from buffers in the buffer cache 205 into the database files on disk.

In addition to a redo log file, a database can maintain an undo log file 208. An undo log sequentially stores information for undoing SQL statements as they are executed. The entries in the undo log file 208 can be used to remove changes to a database made by transactions that are unable to complete successfully or that are to be canceled. Undo entries are copied by the database server processes from the user's memory space to the a log buffer in the System Global Area 203 and then to the undo log file 208 on disk 211 by the Log Writer process 206 as explained above in the case of the redo log buffer 204.

DATA MANIPULATION STATEMENTS

Data manipulation statements operate on the data in a database and are used to perform database query operations. The operations that are performed in response to data manipulation statements include, for example: querying, inserting, updating, and deleting rows of a table, locking a table, and examining the execution plan of an SQL statement.

Many data manipulation operations involve significant alterations to the data in a database, and the loss of the changes made by any one of these operations due to a database instance failure would result in corruption of the database. For these operations, the increased consumption of memory and the increased execution time associated with the creation and writing of log buffers and log files is justified. Other data manipulation operations, however, may involve only trivial or routine manipulations of data. These operations generally do not warrant the increased memory consumption and decreased performance associated with maintaining and writing log entries to log buffers and log files.

Current database systems that offer mechanisms for logging database operations force the logging of all operations that change the database regardless of their specific effect on the data. These systems, therefore, do not provide for optimum allocation of database resources during the execution of database transactions. The present invention provides an improved means of resource utilization by providing a method and apparatus for allowing database user to select which operations will or will not be logged.

In one embodiment, individual data manipulation statements, or groups of statements, contain a logging option parameter which determines whether log entries will be generated for the operation associated with the data manipulation statements. Such a parameter may be set by switches included with the data manipulation statement. For example, the parameter may default to a state in which automatic logging is enabled, and be set to a state in which logging is disabled by including the switch "LOG_OFF" with the data manipulation statement. If the LOG_OFF switch is included in a statement, all subsequent statements within the transaction containing the statement are performed without log entries being written to a log buffer or log file. In this case, the data manipulation statement will execute without storing information about the change made to the database by the statement.

A second switch, such as LOG_ON, can be included with a statement to reactivate the logging of data manipulation operations. When LOG_ON is passed in a data manipulation statement, all subsequent data operations will generate log information to a log buffer. In this case, information about changes made to the database by data manipulation statements will be stored in redo entries in the log buffer 204. These redo entries are ultimately moved to the log file 107 and can then be used to reconstruct changes made to the database in case of an instance failure in the database.

If a separate log buffer is maintained to store undo information, the LOG_OFF and LOG_ON parameters may be passed in the same manner to turn off or turn on the generation of undo entries in the undo log buffer. Just as with the redo log, if a data manipulation statement includes the parameter LOG_OFF, all subsequent statements in the transaction will be performed without logging to the undo log buffer, until another statement is passed with the parameter LOG_ON, at which point subsequent transactions will generate undo log entries as normal.

Alternatively, separate ON and OFF parameters can be included for the redo and undo buffer logs. In this case, the switches REDO_LOG_OFF and UNDO_LOG_ON determine whether redo logs are generated, and the switches UNDO_LOG_OFF and UNDO_LOG_ON determine whether undo logs are generated.

Some operations, such as space management operations and data dictionary operations, require system data to be logged in order to maintain the consistency of the database. Under these circumstances, the LOG_OFF parameter may be used to turn off the logging of only the user data. In this case, log information will still be generated for the system data as required for database consistency, but user data will not be logged.

OBJECT MANIPULATION STATEMENTS

The data in a database can be represented and stored in a variety of ways. The logical structures that organize the storage of data are called "objects", and can include such structures as tables, views, sequences, stored procedures, synonyms, indexes, clusters, and database links.

Object statements define, drop, and alter the structure of database objects. For example, object statements allow a user to create, alter, and remove objects and other database structures, including the database itself, as well as database users. Object statements also allow a user to change the name of objects, delete all the data in an object without removing the object's structure, and analyze certain characteristics about an object. Object manipulation statements implicitly commit the preceding transaction, and start a new transaction.

As with data manipulation statements, information about changes made to the database in response to object manipulation statements are stored as log entries in one or more log buffers. Information describing changes made by object manipulation statements is stored in redo entries in the redo log buffer 204. These entries provide the information necessary to reconstruct changes made to the database by object statements such as CREATE, ALTER, and DROP.

Likewise, information about how to undo changes made by object manipulation statements are stored in undo entries in the undo buffer. These undo entries provide the information necessary to cancel changes made to the database in response to object manipulation statements.

In one embodiment, object manipulation statements can contain a logging option parameter which determines whether the alteration of a data structure by the statement will be logged. A parameter called LOG_OFF could be included with the object manipulation statement to indicate that all subsequent transactions involving that particular object will be performed without logging.

A second parameter such as LOG_ON can be included to reactivate the logging of object manipulation operations for that particular object. When LOG_ON is passed in an object manipulation statement, all subsequent transactions modifying or impacting that object will generate log information. In this case, information about changes made to the database by data manipulation statements will be stored in redo entries. These redo entries can then be used to reconstruct changes made to the database in case of an instance failure in the database.

As mentioned earlier, operations affecting system data may need to be logged to maintain database consistency, regardless of whether the LOG_OFF or LOG_ON parameters are used. During such operations, a log is generated for system data but not for user data.

The LOG_OFF and LOG_ON parameters are passed in the same manner to turn off or turn on logging of object transactions in the undo log buffer. Just as with the redo log, if an object manipulation statement includes the parameter LOG_OFF, all subsequent transactions to the object will be performed without logging to the undo log buffer, until another statement is passed with the parameter LOG_ON, at which point subsequent transactions will generate undo log entries as normal.

In another embodiment, the logging option can be implemented as a flag stored or associated with an object upon or after the creation of the object. For example, a flag such as LOG_OFF or LOG_ON could be passed with or called by the database command that creates an object. This flag will determine whether any object manipulation statement involving that particular object will be logged. If the object is created with the LOG_OFF flag set, then no manipulation statement involving that object will be written to either the redo or undo buffers. If the object is created with the LOG_ON flag, then all manipulation statements involving that object will be written to the redo and undo buffers.

In yet another embodiment, the logging option for object manipulation statements may be implemented as a database-wide parameter set at the beginning of a particular instance, such as at power up. In this case, the logging option will be set for all users and for all, or a specified group of objects for the duration of the instance. According to one embodiment, the database-wide parameter may be changed "on-the-fly" by a database administrator. An embodiment in which the logging option parameter affects logging for all transactions connected to a database instance has the advantage of reducing the amount of parameter passing for database operations. However, an instance-wide logging option reduces the flexibility of individual users to activate or deactivate logging for individual objects, statements or transactions.

In an alternate embodiment, each tablespace within the database may have its own LOG_ON/LOG_OFF flag. A tablespace is logical storage unit which may be used to divide the database. When the flag of a tablespace is set to LOG_ON, then all subsequent transactions modifying or impacting that data within the tablespace will generate log information. Conversely, when the flag of a tablespace is set to LOG_OFF, then all subsequent transactions involving data within the tablespace will be performed without logging user data.

Several logging option schemes could be implemented simultaneously within a single database system. For example, a database system could provide a number of different logging option parameters and flags for various data operations, objects, and users within the system. In this case a logging option hierarchy can be implemented to resolve conflicts between inconsistent log options. For example, the database could be implemented such that object manipulation logging takes precedence over data manipulation logging. In this example, if an object is explicitly created with the LOG_OFF flag set, no statements involving this object will be logged, even those executed by data manipulation statements for which the LOG_ON parameter was set.

Figure 3:
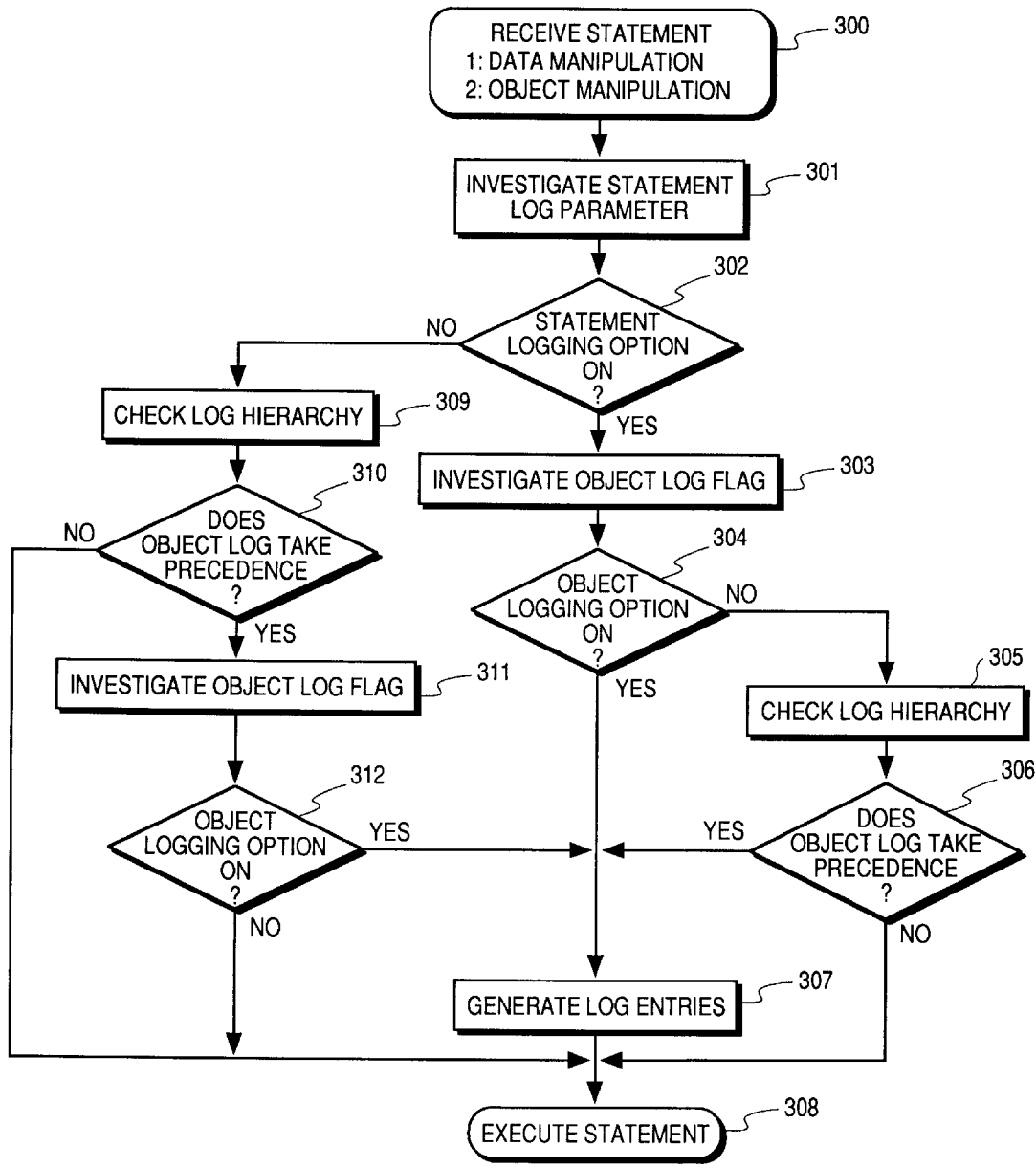
FIG. 3 is a flow chart illustrating the execution of a database statement when the user selectable logging option is implemented according to an embodiment of the invention.

FIG. 3 is a flowchart illustrating the operations performed by a database to execute a statement when user selectable logging is implemented according to one embodiment of the present invention. At step 300, a database statement is received. This statement could be a data manipulation statement, an object manipulation statement, or some other type of database statement. At step 301, the log parameter associated with the statement is determined. If the parameter indicates that the statement is to be logged at step 302, then the process investigates the object log flag associated with the object at step 303. If, at step 304, the object log flag indicates that logging is to be performed when changes are made to the object, then log entries are generated for the operation performed in response to the statement, as indicated in step 307. The database could include separate log files for a redo entries and undo entries, or a single log file for both purposes. When the log entries have been created, the operation indicated by the data manipulation statement is executed in step 308.

Even if a process does not require a statement to be logged, this statement may still be logged if it acts on an object which requires its changes to be logged, and object logging takes precedence over statement logging. Thus, at step 302, if the statement logging parameter indicates that logging is not to be performed, a predetermined log hierarchy 309 will be checked. This log hierarchy simply indicates whether statement logging takes precedence over object logging. If object logging does not take precedence over statement logging, then from step 310, the statement is executed in step 308 without generating log entries. If object logging does take precedence over statement logging, then the object log flag is investigated in step 311. If the object logging option is not on as determined in step 312, then the data manipulation statement is executed in step 308 without generating log entries. If, however, the object logging option is on, then log entries are generated in step 307 prior to execution of the data manipulation operation statement in step 308.

The log hierarchy must also be checked when, at step 303, the object log flag indicates that object logging is not to be performed. Thus, at step 304, if the object log flag indicates that logging is not to be performed, the log hierarchy 305 may ultimately determine that log entries will indeed be generated. At step 306, if object logging does not take precedence over statement logging, then log entries are generated in step 307 prior to execution. If object logging does take precedence over statement logging, then the statement is executed in step 308, and no log entries are generated.

The logging option selection process described above is merely one example of how a database user can select whether a particular database operation will be logged. The order of the various steps may vary depending upon the particular implementation. For example, as stated above, a database may have a parameter and flag indicating whether to turn on or off logging, that applies to all transactions in a database instance, all operations performed by a particular user, operations associated with specific statements or sets of statements, and/or all operations associated with particular objects or sets of objects.

Another embodiment may provide only a single parameter or flag to select logging, without providing one each for data manipulation statements and object manipulation statements. Yet another embodiment may provide additional logging option flags for other types of database statements such as transaction control statements, session control statements, and embedded SQL statements. The present invention is not limited to any particular technique for logging option parameter passing.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing an operation that specifies a change to be made to user data in a database, the method comprising the steps of:

receiving a request to Perform said operation said request including a parameter;

inspecting a value assigned to said parameter;

if said parameter is set to a first value, then
changing said user data, and
generating a log that reflects said change to said user data; and if said parameter is set to a second value, then
changing said user data without generating said log that reflects said change to said user data.

2. The method of claim 1 wherein the step of generating a log that reflects said change to said user data includes the step of generating a redo log that specifies how to repeat said change to said user data.

3. The method of claim 1 wherein the step of generating a log that reflects said change to said user data includes the step of generating an undo log that specifies how to undo said change to said user data.

4. The method of claim 1 wherein said log that reflects said change to said user data is one of a redo log and an undo log, and wherein the method further includes the steps of:

inspecting a value assigned to a second parameter;

if said second parameter is set to a third value, then generating the other of said redo log or said undo log;

if said second parameter is set to fourth value, then performing said operation without generating said other of said redo log or said undo log.

5. The method of claim 1, wherein:

the step of receiving a request to perform said operation includes receiving a statement that specifies said operation; and the method further includes the steps of:
parsing said statement to determine whether said statement has a switch associated with said parameter, and
if said statement has a switch associated with said parameter, then
assigning said parameter said value based on the switch contained in said statement.

6. The method of claim 5 further comprising the steps of:

after receiving said statement, receiving subsequent statements that specify operations which change said user data in the database;

if said parameter is set to said first value, then generating logs that reflect changes made by said operations to said user data while performing said operations;

if said parameter is set to said second value, then performing said operations without generating logs that reflect the changes made to said user data by said operations; and wherein a transaction includes both said statement and said subsequent statements.

7. The method of claim 6 wherein:

one of said subsequent statements includes a second switch associated with said parameter; and assigning said parameter a second value based on said second switch.

8. The method of claim 1 wherein:

the step of receiving a request to perform said operation includes receiving a statement that specifies said operation; and the step of inspecting a value assigned to a parameter includes the steps of:
  parsing said statement to determine a set of data within said database that is changed by said statement, and
  reading said value from a stored flag associated with said set of data.

9. The method of claim 1 wherein:

the step of inspecting said value assigned to said parameter includes the step of reading a database-wide parameter value;

the method further includes the steps of
  if said database-wide parameter is set to a first value, then generating logs that reflect changes to user data for operations that change user data in said database;
  if said database-wide parameter is set to a second value, then
    performing operations that change user data in said database without generating logs that reflect changes to the user data for said operations; and
  wherein said operations are specified by a plurality of distinct transactions connected to said database.

10. A method of performing an operation that specifies a change to be made to user data in a database, the method comprising the steps of:

if a first parameter is higher than a second parameter in a predetermined hierarchy, then performing the steps of inspecting a value assigned to said first parameter;
  if said first parameter is set to a first value, then changing said user data, and generating a log that reflects said change to said user data;
  if said first parameter is set of a second value, then performing said operation without generating said log that reflects said change to said user data;
if said second parameter is higher than said first parameter in said predetermined hierarchy, then performing the steps of inspecting a value assigned to said second parameter;
  if said second parameter is set to a third value, then changing said user data, and
    generating a log that reflects said change to said user data; and
  if said second parameter is set of a fourth value, then performing said operation without generating said log that reflects said change to said user data.

11. The method of claim 10 wherein:

the method further includes the step of receiving a statement that specifies said operation;

the step of inspecting a value assigned to said first parameter includes reading a switch specified in said statement; and the step of inspecting a value assigned to said second parameter includes reading a flag associated with a set of data that will be modified by performance of said operation.

12. A method of performing an operation that specifies a change to be made to data in a database, the method comprising the steps of:

receiving a request to perform said operation, said request including a parameter;

inspecting a value assigned to said parameter;

if said parameter is set to a first value, then
  performing said operation, and generating data for undoing changes made by said operation; and if said parameter is set to a second value, then
  performing said operation without generating data for undoing changes made by said operation.

13. A computer-readable medium carrying one or more sequences of one or more instructions, wherein the execution of the one or more sequences of the one or more instructions causes the one or more processors to perform the steps of:
  receiving a request to perform an operation that specifies a change to be made to user data in a database, said request including a parameter;
  inspecting a value assigned to said parameter;
  if said parameter is set to a first value, then
    changing said user data, and
    generating a log that reflects said change to said user data; and
  if said parameter is set to a second value, then
    changing said user data without generating said log that reflects said change to said user data.

14. The computer-readable medium of claim 13 wherein the step of generating a log that reflects said change to user data includes the step of generating a redo log that specifies how to repeat said change to said user data.

15. The computer-readable medium of claim 13 wherein the step of generating a log that reflects said change to said user data includes the step of generating a undo log that specifies how to undo said change to said user data.

16. The computer-readable medium of claim 13, wherein:

the step of receiving a request to perform said operation includes receiving a statement that specifies said operation; and the computer readable medium further includes one or more sequences of one or more instructions for performing the steps of:
  parsing said statement to determine whether said statement has a switch associated with said parameter, and
  if said statement has a switch associated with said parameter, then
    assigning said parameter said value based on the switch contained in said statement.

17. The computer-readable medium of claim 16 further comprising one or more sequences of one or more instructions for performing the steps of:

after receiving said statement, receiving subsequent statements that specify operations which change said user data in the database;

if said parameter is set to said first value, then generating logs that reflect changes made by said operations to said user data while performing said operations;

if said parameter is set to said second value, then performing said operations without generating logs that reflect the changes made to said user data by said operations; and wherein a transaction includes both said statement and said subsequent statements.

18. The computer-readable medium of claim 17 wherein:

one of said subsequent statements includes a second switch associated with said parameter; and the computer-readable medium includes a sequence of instructions which causes said processor to assign said parameter a second value based on said second switch.

19. The computer-readable medium of claim 13 wherein:

the step of receiving a request to perform said operation includes receiving a statement that specifies said operation; and the step of inspecting a value assigned to a parameter includes the steps of:

parsing said statement to determine a set of data within said database that is changed by said statement; and reading said value from a stored flag associated with said set of data.

20. The computer-readable medium of claim 13 wherein:

the step of inspecting said value assigned to said parameter includes the step of reading a database-wide parameter value;

the computer-readable medium further includes sequences of instructions for performing the steps of if said database-wide parameter is set to a first value, then generating logs that reflect changes made to user data in said database; and if said database-wide parameter is set to a second value, then performing operations that change user data in said database without generating logs that reflect changes to user data, wherein said operations are specified by a plurality of distinct transactions connected to said database.

* * * * *